United States Patent [19]
Justice et al.

[11] Patent Number: 5,755,636
[45] Date of Patent: May 26, 1998

[54] MULTIPLE-SPEED AUTOMATIC TRANSMISSION FOR AN AUTOMOTIVE VEHICLE

[75] Inventors: Clinton F. Justice; Stanley L. Pierce, both of Northville; Robert J. Miller, Livonia, all of Mich.

[73] Assignee: Ford Global Technologies, Inc., Dearborn, Mich.

[21] Appl. No.: 639,394

[22] Filed: Apr. 29, 1996

[51] Int. Cl.$^6$ .................... F16H 57/10; F16H 1/32
[52] U.S. Cl. .................... 475/275; 475/279; 475/286
[58] Field of Search ................ 475/275, 279, 475/280, 286, 287, 290, 291

[56] References Cited

U.S. PATENT DOCUMENTS

| | | | |
|---|---|---|---|
| 3,863,524 | 2/1975 | Mori et al. | 475/279 |
| 3,946,622 | 3/1976 | Murakami et al. | 475/275 |
| 3,979,974 | 9/1976 | Murakami | 475/281 |
| 4,143,562 | 3/1979 | Murakami et al. | 475/280 |
| 4,242,924 | 1/1981 | Melhorn et al. | 475/276 |
| 4,368,649 | 1/1983 | Vahratian et al. | 475/275 |
| 4,418,585 | 12/1983 | Pierce | 475/279 |
| 4,483,215 | 11/1984 | Ishimaru et al. | 475/280 |
| 4,509,389 | 4/1985 | Vahratian et al. | 475/275 |
| 4,702,125 | 10/1987 | Kalns | 475/275 |
| 4,939,955 | 7/1990 | Sugano | 475/278 |
| 4,976,670 | 12/1990 | Klemen | 475/278 |
| 5,007,887 | 4/1991 | Asada | 475/280 X |
| 5,250,011 | 10/1993 | Pierce | 475/279 X |
| 5,342,257 | 8/1994 | Hotta et al. | 475/275 |

FOREIGN PATENT DOCUMENTS

| | | | |
|---|---|---|---|
| 52-74766 | 6/1977 | Japan | 475/286 |
| 2272735 | 5/1994 | United Kingdom . | |

*Primary Examiner*—Khoi Q. Ta
*Attorney, Agent, or Firm*—Frank G. McKenzie

[57] ABSTRACT

A kinematic arrangement of an automatic transmission includes three simple planetary gear units having certain elements fixed to other elements mutually, a one-way coupling for holding the ring gear of the first gear unit against rotation, brakes for holding the carrier of the third gear unit and the sun gears of the second and third gear units against rotation on the transmission housing, two friction clutches arranged in parallel between the input shaft and the sun gears of the second and third planetary gear units, a brake band for holding the ring gear of the third gear unit and carrier of the second gear unit against rotation, and a friction clutch for holding the sun gear of the first gear unit against rotation.

8 Claims, 1 Drawing Sheet

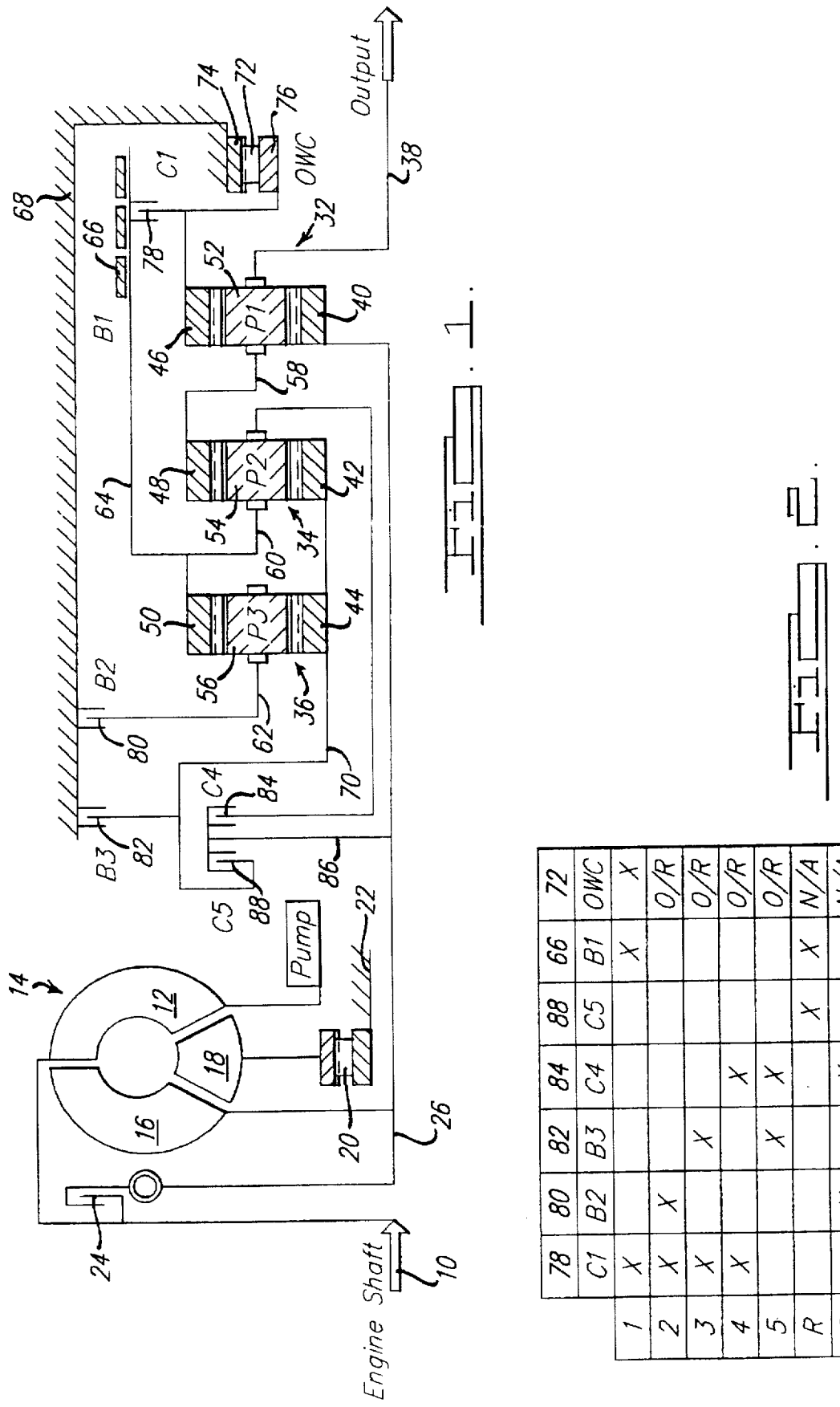

MULTIPLE-SPEED AUTOMATIC TRANSMISSION FOR AN AUTOMOTIVE VEHICLE

BACKGROUND OF THE INVENTION

1. Technical Field

This invention relates to an arrangement of clutches, brakes, and planetary gear units of an automatic transmission for a motor vehicle.

2. Description of the Prior Art

The gear system of U.S. Pat. No. 4,418,585 includes a pair of planetary gear units mounted on a first axis and an hydrokinetic torque converter mounted on a second axis parallel to the first axis. These are arranged to accommodate a vehicle engine that is mounted transversely with respect to the center plane of a motor vehicle. The transmission is able to provide four forward driving ratios and a single reverse ratio, the highest forward driving ratio being an overdrive.

U.S. Pat. No. 4,368,649 discloses planetary gearing that achieves a ratio change from the third to the fourth forward ratio without establishing timed disengagement of a high speed ratio clutch and application of a friction brake. It is only necessary to apply a single friction brake to achieve a ratio change to the highest ratio. A ratio change from the first to the second forward drive ratio results merely by engaging a second friction brake while the companion friction clutch remains applied. Therefore, a ratio change from the first ratio and from the third ratio in a forward range results merely by engaging and disengaging a single friction element, either a clutch or a brake, thereby greatly simplifying control of the clutches and smoothing the ratio changes during vehicle acceleration from a standing start.

SUMMARY OF THE INVENTION

It is an object of this invention to provide a multiple-speed automatic transmission producing five or six forward speeds and a reverse drive, having a nonsynchronous upshift from first speed to second speed and a nonsynchronous downshift from second speed to first speed. The transmission provide a reaction brake element for operation in drive and coast conditions.

In realizing these advantages and objects, a multiple-speed transmission according to this invention includes an input shaft, an output shaft, friction elements, and planetary gearing supported on a first axis comprising multiple planetary gear units, each gear unit having a sun gear, ring gear, carrier, and planet pinions supported rotatably on the carrier and driveably engaged with the sun gear and ring gear of the corresponding gear unit. The sun gear of the first gear unit is continually driveably connected to the input shaft. The ring gear of the second gear unit and carrier of the first gear unit are continually driveably connected mutually and to the output shaft. The carrier of the second gear unit and ring gear of the third gear unit are continually driveably connected mutually. The sun gears of the second and third gear units are also continually driveably connected mutually.

A first clutch alternately driveably connects and releases the ring gear of the first gear unit and ring gear of the third gear unit and carrier of the second gear unit. A first brake means alternately holds against rotation and releases the ring gear of the first gear unit. A first brake alternately holds against rotation and releases the carrier of the third gear unit. A second brake alternately holds against rotation and releases the sun gears of the second and third gear units. A second clutch alternately driveably connects and releases the input shaft and carrier of the second gear unit. A third clutch alternately driveably connects and releases the input shaft and sun gears of the second and third gear units.

BRIEF DESCRIPTION OF THE DRAWINGS

FIG. 1 is a schematic diagram of a kinematic arrangement of an automatic transmission according to the present invention.

FIG. 2 is a chart showing the state of the friction elements of FIG. 1 corresponding to each of the speed ratios of the transmission according to the present invention.

DESCRIPTION OF THE PREFERRED EMBODIMENT

Referring first to FIG. 1, an engine crankshaft 10 drives a bladed impeller wheel 12 of a hydrokinetic torque converter 14, which includes a bladed turbine wheel 16 driven hydrodynamically from the impeller, and a bladed stator wheel 18 rotatably supported on a one-way clutch 20, which produces a one-way drive connection between a nonrotating shaft 22 and the stator wheel. A torque converter bypass clutch 24 is engaged and disengaged alternately to produce a fixed connection between the impeller wheel and the turbine shaft or input shaft 26, or to disengage that connection so that the input shaft is hydrodynamically connected to the impeller wheel.

Three planetary gear units are located in a drive path between input shaft 26 and transmission output shaft 38. Each gear unit includes a sun gear 40, 42, 44; ring gear 46, 48, 50; a set of planet pinions 52, 54, 56, in continuous meshing engagement with the corresponding ring gear and sun gear and supported rotatably on a corresponding planetary pinion carrier 58, 60, 62.

Sun gear 40 is continually connected driveably to input shaft 26, and carrier 58 is continually driveably connected to output shaft 38. Carrier 58 and ring gear 48 are continually driveably connected mutually. A brake drum 64, fixed continually to carrier 60 and ring gear 50, is engaged and released alternately by brake band 66, whose servo is fixed against rotation on the transmission housing 68 so that when band 66 engages drum 64, carrier 60 and ring gear 50 are fixed against rotation on the housing and released to turn freely when band 66 is released. Member 70 driveably connects continuously sun gears 42 and 44 mutually.

Coupling 72 includes a drive member that produces a one-way drive connection between the inner and outer races 74, 76 in one rotary direction and driveably disconnects races 74, 76 in the opposite rotary direction. Outer race 74 is fixed permanently against rotation on the housing 68. Inner race 76 is continually connected to ring gear 46 and is releasably connected through the friction clutch 78 to brake drum 64.

An hydraulically actuated friction brake 80 alternately holds pinion carrier 62 against rotation on the transmission housing when brake 80 is engaged and releases carrier 62 to rotate freely when the brake is disengaged. An hydraulically actuated friction brake 82 alternately holds sun gears 44 and 42 against rotation on the transmission housing when brake 80 is engaged and releases sun gears 42, 44 to rotate freely when brake 82 is disengaged.

A friction clutch 84 alternately driveably connects mutually pinion carrier 60 and input shaft 26 through a connection formed by radial member 86 when clutch 84 is engaged and disconnects carrier 60 and input shaft 26 when clutch 84 is disengaged. Another hydraulically actuated friction clutch 88 alternately driveably connects mutually sun gears 44, 42 and input shaft 26 when clutch 88 is engaged and disconnects the driveable connection between sun gears 42, 44 and input shaft 26 when clutch 88 is disengaged.

In operation, a first forward speed ratio results by engaging clutch 78 and brake 66, which action causes clutch 72 to drive and to hold ring gear 46 against rotation on the transmission housing. Input shaft 26 drives ring gear 40, and the output is taken at carrier 58 and output shaft 38, thereby producing a speed reduction through the first planetary gear unit. During coast conditions, one-way clutch 72 overruns; therefore, a torque reaction is produced by engagement of clutch 78 and coast brake 66, which holds ring gear 46 against rotation providing engine braking during coast conditions.

The second forward speed results by maintaining engagement of clutch 78 and engaging brake 80. Ring gear 50 and carrier 60 rotate at the same speed, sun gears 42 and 46 rotate at the same speed, and carrier 62 is held against rotation due to the engagement of brake 80. Therefore, the output is taken at ring gear 48, carrier 58, and output shaft 38. A drive-range automatic upshift from the first to the second speed ratio and an automatic downshift in the drive-range from the second to the first speed ratio are nonsynchronous. Brake 66 is engaged preferably when the IM range is selected and is disengaged during operation in he drive-range.

An automatic drive-range upshift to the third speed ratio results by maintaining clutch 78 engaged, disengaging brake 80, and engaging brake 82. This action causes one-way coupling 72 to overrun. Ring gear 46, ring gear 50, and carrier 60 are mutually driveably connected through engagement of clutch 78. Sun gear 42 of the second planetary gear unit 34 is held fixed against rotation through engagement of brake 82. Input shaft 26 drives sun gear 40, and the output is taken at carrier 58 and output shaft 38.

An automatic upshift to the fourth speed ratio results by maintaining clutch 78 engaged, disengaging brake 82, and engaging clutch 84. These actions cause one-way coupling 72 to overrun. Carrier 60 is driveably connected to input shaft 26 through engagement of clutch 84, and sun gear 40 is also driven from the input shaft directly. Due to the engagement of clutch 78, carrier 60 and sun gear 46 turn at the same speed, the speed of input shaft 26. Therefore, the output, taken at carrier 58 and output shaft 38, is a direct drive through planetary gear unit 32.

To produce the fifth forward speed ratio, clutch 78 is disengaged, clutch 82 is engaged, and clutch 84 is engaged. These actions cause coupling 72 to overrun. The engagement of clutch 84 driveably connects input shaft 26 to carrier 62, and sun gear 40 is directly driven by input shaft 26. The engagement of brake 82 holds sun gear 42 fixed against rotation and provides a torque reaction. Therefore, the output of the second planetary gear unit, ring gear 48, overdrives carrier 58 and output shaft 38 in relation to the speed of input shaft 26.

The sixth forward speed ratio results by engaging brake 80 and clutch 84. Brake 80 holds carrier 62 against rotation providing a torque reaction, and ring gear 50 of the third planetary gear unit 36 is driven from the input shaft due to the engagement of clutch 84. Therefore, sun gears 44 and 42 are overdriven in a reverse direction in relation to input shaft 26. Carrier 60 is driven at the speed of the input shaft and sun gear 42 is overdriven. Therefore, the output, taken at ring gear 48, carrier 58, and output shaft 38, is overdriven in relation to the speed of the input shaft and in the same direction as that of input shaft 26.

Reverse drive is produced by engaging clutch 88 and brake 66. Carrier 60 of the second planetary gear unit 34 is held fixed against rotation due to the engagement of brake band 66. Sun gear 42 of the second planetary gear unit is driven through engagement of clutch 88 from input shaft 26. Therefore, the output, taken at ring gear 48, carrier 58, and output shaft 38, is an underdrive ratio and the direction of rotation is opposite to that of input shaft 26.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A multiple-speed transmission comprising:

an input shaft;

an output shaft;

planetary gearing supported on a first axis comprising multiple planetary gear units, each gear unit having a sun gear, ring gear, carrier, and planet pinions supported rotatably on the carrier and driveably engaged with the sun gear and ring gear of the corresponding gear unit, the sun gear of the first gear unit continually driveably connected to the input shaft, the ring gear of the second gear unit and carrier of the first gear unit continually driveably connected mutually and to the output shaft, the carrier of the second gear unit and ring gear of the third gear unit continually driveably connected mutually, the sun gears of the second and third gear units continually driveably connected mutually;

a first clutch for alternately driveably connecting and releasing the ring gear of the first gear unit and the ring gear of the third gear unit and carrier of the second gear unit;

first brake means for alternately holding against rotation and releasing the ring gear of the first gear unit;

a first brake for alternately holding against rotation and releasing the carrier of the third gear unit; and a second brake for alternately holding against rotation and releasing the sun gears of the second and third gear units.

2. The transmission of claim 1, wherein the brake means comprises:

an overrunning coupling adapted to produce a one-way drive connection between the ring gear of the first gear unit and a nonrotating member; and a third brake for alternately holding against rotation and releasing the ring gear of the first gear unit.

3. The transmission of claim 1, further comprising a housing, and wherein the brake means comprises:

an overrunning coupling having a first race continually driveably connected to the ring gear of the first gear unit, a second race fixed to the housing, and a drive member located between the first and second races for producing a one-way drive connection between the first and second races; and a third brake arranged in parallel with the overrunning coupling between the ring gear of the first gear unit and the housing for alternately holding against rotation on the housing and releasing said ring gear.

4. The transmission of claim 1, further comprising a second clutch for alternately driveably connecting and releasing the input shaft and carrier of the second gear unit.

5. The transmission of claim 1, further comprising a third clutch for alternately driveably connecting and releasing the input shaft and sun gears of the second and third gear units.

6. A multiple-speed transmission comprising:

an input shaft;

an output shaft;

planetary gearing supported on a first axis comprising multiple planetary gear units, each gear unit having a sun gear, ring gear, carrier, and planet pinions supported rotatably on the carrier and driveably engaged with the sun gear and ring gear of the corresponding gear unit, the sun gear of the first gear unit continually driveably connected to the input shaft, the ring gear of the second gear unit and carrier of the first gear unit continually driveably connected mutually and to the output shaft, the carrier of the second gear unit and ring gear of the third gear unit continually driveably connected mutually, the sun gears of the second and third gear units continually driveably connected mutually;

a first clutch for alternatively driveably connecting and releasing the ring gear of the first gear unit and the ring gear of the third gear unit and carrier of the second gear unit;

first brake means for alternately holding against rotation and releasing the ring gear of the first gear unit;

a first brake for alternately holding against rotation and releasing the carrier of the third gear unit; and a second brake for alternately holding against rotation and releasing the sun gears of the second and third gear units;

a second clutch for alternately driveably connecting and releasing the input shaft and carrier of the second gear unit; and a third clutch for alternately driveably connecting and releasing the input shaft and sun gears of the second and third gear units.

7. The transmission of claim 6, wherein the brake means comprises:

an overrunning coupling adapted to produce a one-way drive connection between the ring gear of the first gear unit and a nonrotating member; and a third brake for alternately holding against rotation and releasing the ring gear of the first gear unit.

8. The transmission of claim 6, further comprising a housing, and wherein the brake means comprises:

an overrunning coupling having a first race continually driveably connected to the ring gear of the first gear unit, a second race fixed to the housing, and a drive member located between the first and second races for producing a one-way drive connection between the first and second races; and a third brake arranged in parallel with the overrunning coupling between the ring gear of the first gear unit and the housing for alternately holding against rotation on the housing and releasing said ring gear.

* * * * *